UNITED STATES PATENT OFFICE.

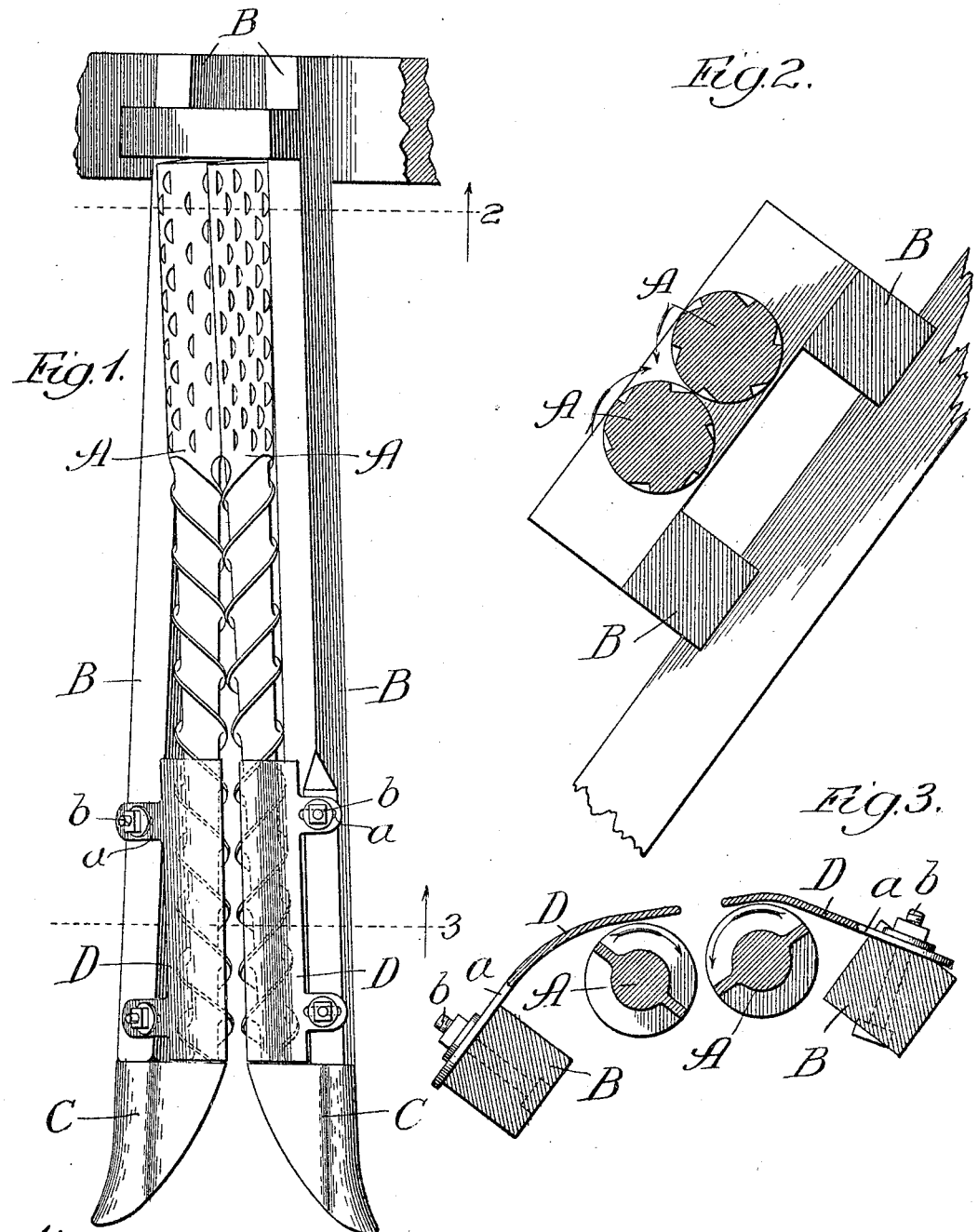

JAMES E. GOODHUE, OF ST. CHARLES, ILLINOIS.

CORN-HARVESTER.

No. 799,845.　　　　Specification of Letters Patent.　　　　Patented Sept. 19, 1905.

Application filed May 15, 1905. Serial No. 260,473.

*To all whom it may concern:*

Be it known that I, JAMES E. GOODHUE, a citizen of the United States, residing at St. Charles, in the county of Kane and State of Illinois, have invented a new and useful Improvement in Corn-Harvesters, of which the following is a specification.

My invention relates to an improvement in corn-harvesting machines of the class which gather the ears of corn from standing stalks in the field by means of forwardly-inclined snapping-rollers.

My present invention is in the nature of an improvement upon the construction shown and described in United States Letters Patent No. 787,750, granted to me April 18, 1905, my present object being to provide the snapping-rollers with guard mechanism of improved construction for preventing injury to ears growing low upon standing stalks or which, in the case of down corn, are engaged by the forward ends of the snapping-rollers moving in a plane close to the ground.

The snapping-rollers as they are mounted in the machine flare apart slightly in the direction of their forward ends sufficiently to receive between them the lower and consequently larger portions of the standing stalks. It frequently happens that ears of corn hang very low upon their stalks or when the stalks are down extend so close to the ground that the forward ends of the rollers engage and crush them, thereby inflicting damage thereto which it is desirable to avoid. I overcome this difficulty in the present construction by providing guards along the forward end portions of the rollers which engage and lift low-lying ears of corn, raising them more or less high upon the rollers, where the construction of the latter causes the ears to be snapped from the stalks instead of being drawn between the rollers.

In the drawings, Figure 1 is a broken plan view of a portion of a corn-harvesting machine of the class described, showing the snapping-rollers and inclined frame on which they are mounted; and Figs. 2 and 3, enlarged sections taken on lines 2 and 3 in Fig. 1.

As in my aforesaid patent, the coöperating snapping-rollers A A are mounted in the frame B to extend spirally with relation to each other along their adjacent surfaces. Thus at their lower forward ends they extend in the nearly horizontal plane with relation to each other, as indicated in Fig. 3, while at their upper ends they extend with relation to each other in a plane more or less nearly vertical, as indicated in Fig. 2. In addition to extending somewhat spirally with relation to each other, the snapping-rollers flare relatively to a slight extent toward their lower forward ends to present an opening between them large enough to receive the lower and consequently larger portions of the cornstalks. For approximately one-third the distance upward from the lower ends of the rollers the space between them is large enough to engage and draw between the rollers any and particularly small ears of corn which may hang low upon the stalks or otherwise extend close to the ground. The drawing of the ears between the rollers would tend to mutilate the ears.

On the lower ends of the bars B, which constitute the roller-frame, are flaring guide shoes or points C, as shown. Adjustably fastened upon the bars B are relatively sliding guard-plates D, having elongated openings $a$, through which they are fastened by means of bolts $b$ to the bars. The guard-plates are adjusted to leave an opening between them over the space between the rollers too narrow to permit the passage between them of ears of corn and just large enough to admit of the passage of the cornstalks. As the rollers move along the stalks any low-lying ears will rest and slide upward upon one or the other, or both, of the guard-plates, which may extend, as indicated, approximately one-third the length of the rollers. Above the guard-plates the rollers are sufficiently close together to preclude the entrance of the ears, which are therefore straightened out upon their stems and snapped off in the usual way.

The rollers A for a distance approximating two-thirds of their lengths are formed with spirals, the grooves being relatively deep at the lower forward ends, growing shallower as they rise. This alone would render the rollers relatively flaring at their initial stalk-engaging ends, even though the worm or spiral ridges were of the same diameter throughout or of increasing diameter to their lower ends. By the term "relatively flaring rollers" it is to be understood that the spiral stalk-engaging opening between them is larger at its lower end and becomes smaller as it rises along the rollers. The whole object of the flaring construction is to readily admit the stalks at the lower ends of the rollers and farther up to be close enough together to snap off ears without danger of crushing them.

What I claim as new, and desire to secure by Letters Patent, is—

In a corn-harvesting machine of the character described, the combination with the frame, of a pair of inclined rotary and coöperating snapping-rollers, provided along their lower forward end portions with spiral grooves forming between the rollers a gradually narrowing stalk-receiving channel, and ear-sustaining guards on the frame forming between them a channel for the passage of the stalks, but too narrow for the passage of ears of corn, and extending from the lower ends of the rollers for a portion only of the length thereof to guide low ears of corn to the narrowed part of the channel between the snapping-rollers beyond the ends of the guards, substantially as and for the purpose set forth.

JAMES E. GOODHUE.

In presence of—
M. G. ALVERSON,
CHAS. A. MILLER.